April 17, 1956  J. F. STEPHENS ET AL  2,742,240
MAT WINDING MACHINE
Filed April 1, 1953  4 Sheets-Sheet 1
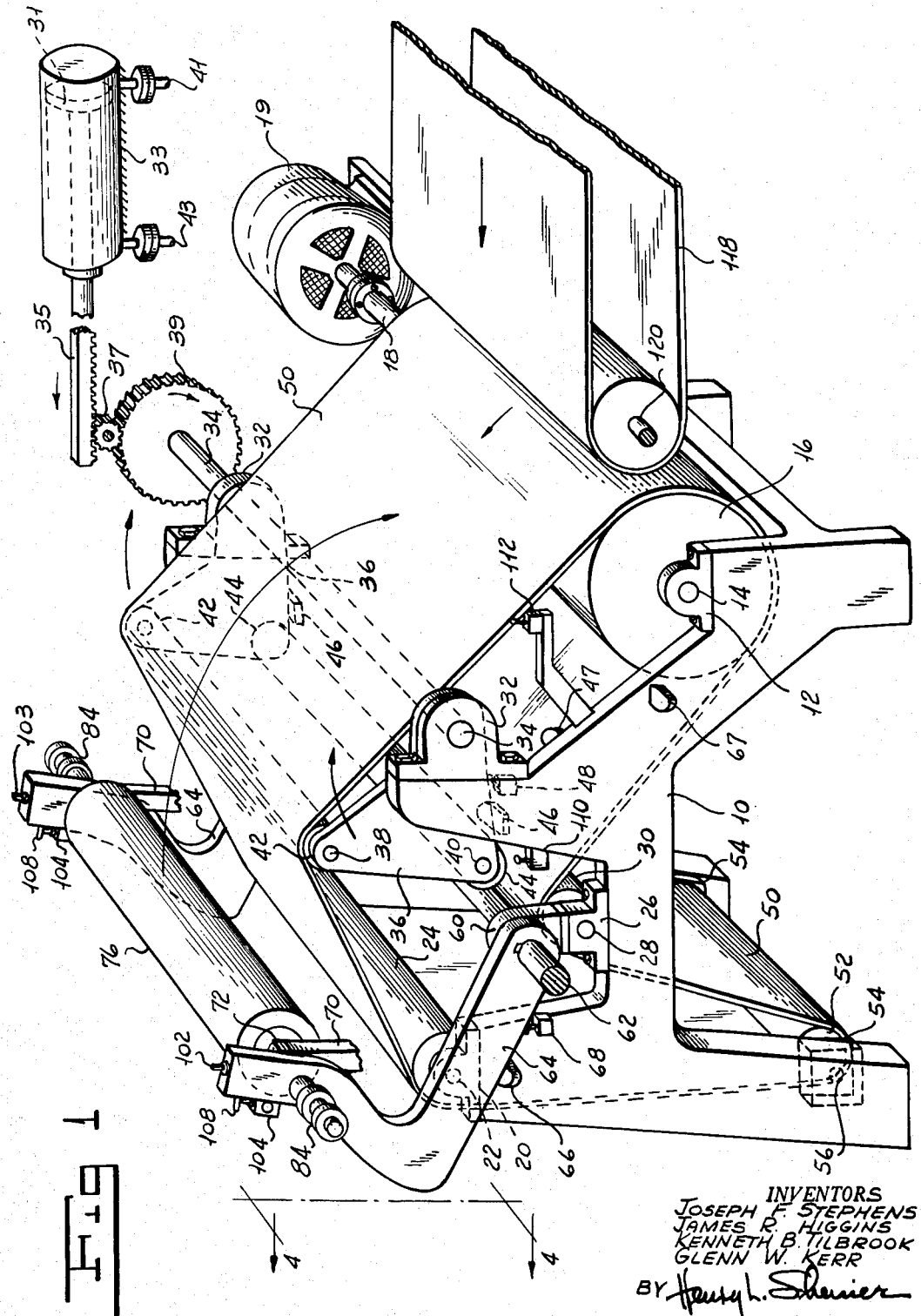
INVENTORS
JOSEPH F. STEPHENS
JAMES R. HIGGINS
KENNETH B. TILBROOK
GLENN W. KERR
BY Henry L. Scherier
ATTORNEY

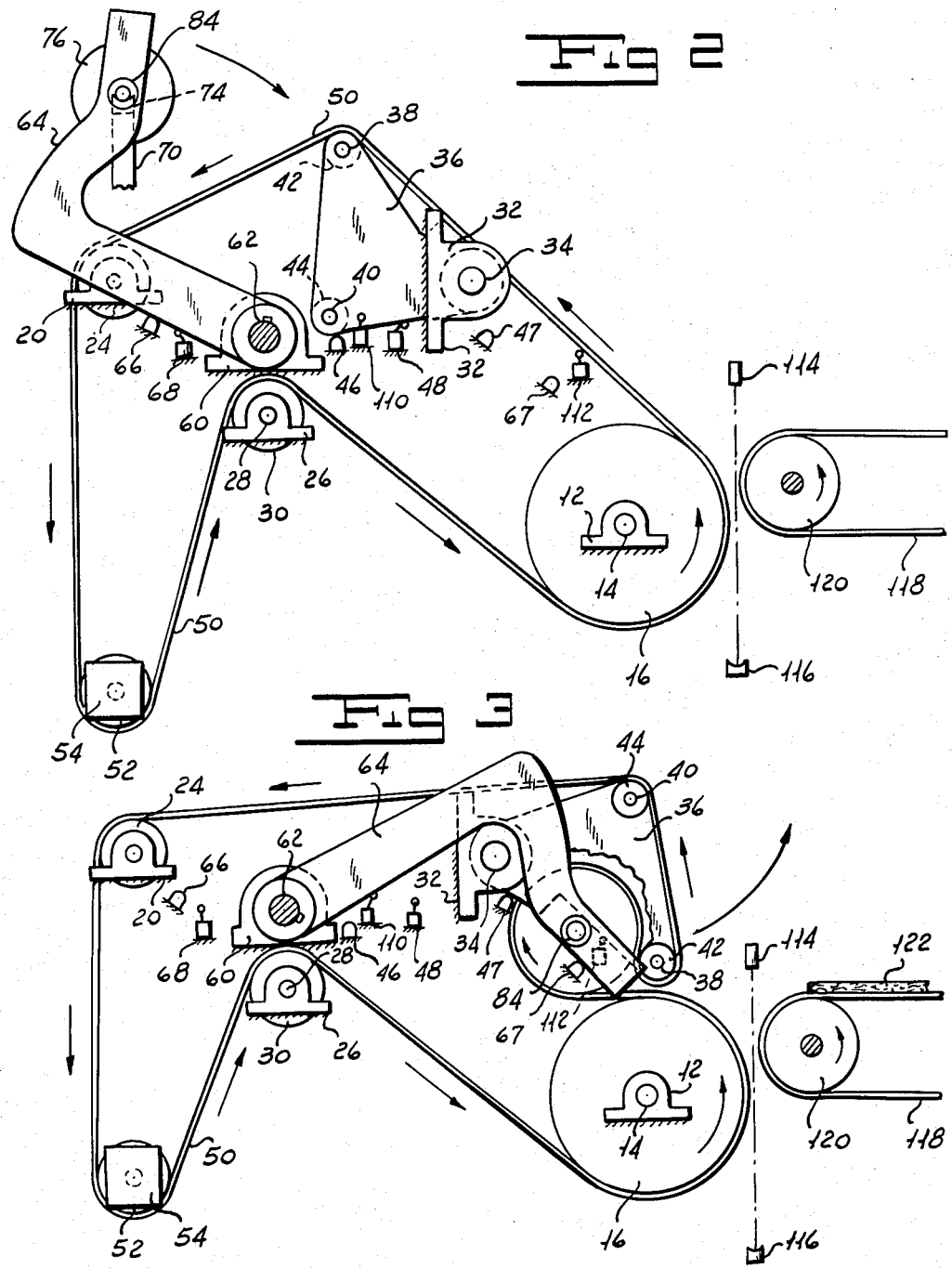

April 17, 1956  J. F. STEPHENS ET AL  2,742,240
MAT WINDING MACHINE
Filed April 1, 1953 4 Sheets-Sheet 3
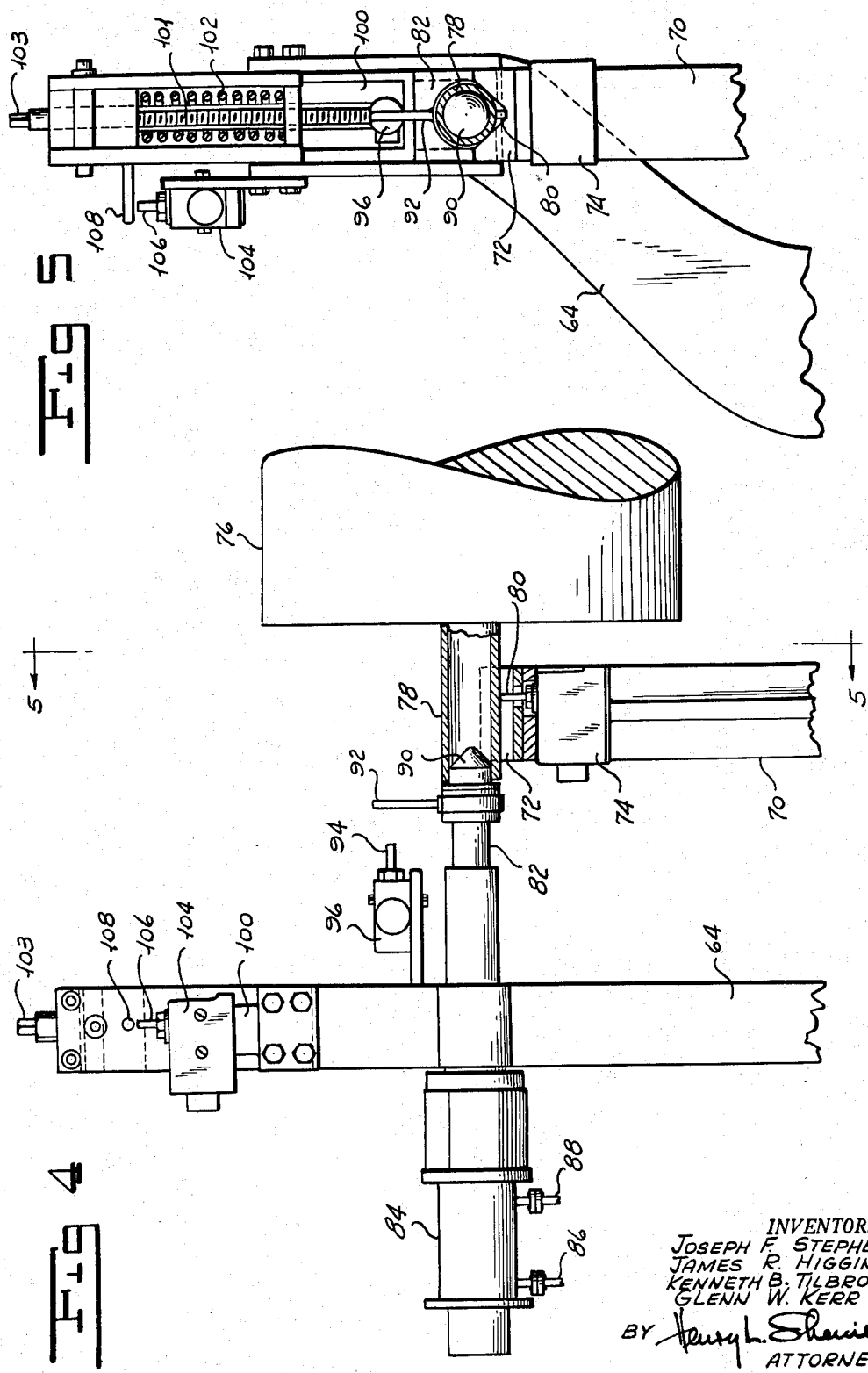
INVENTORS
JOSEPH F. STEPHENS
JAMES R. HIGGINS
KENNETH B. TILBROOK
GLENN W. KERR
BY
ATTORNEY

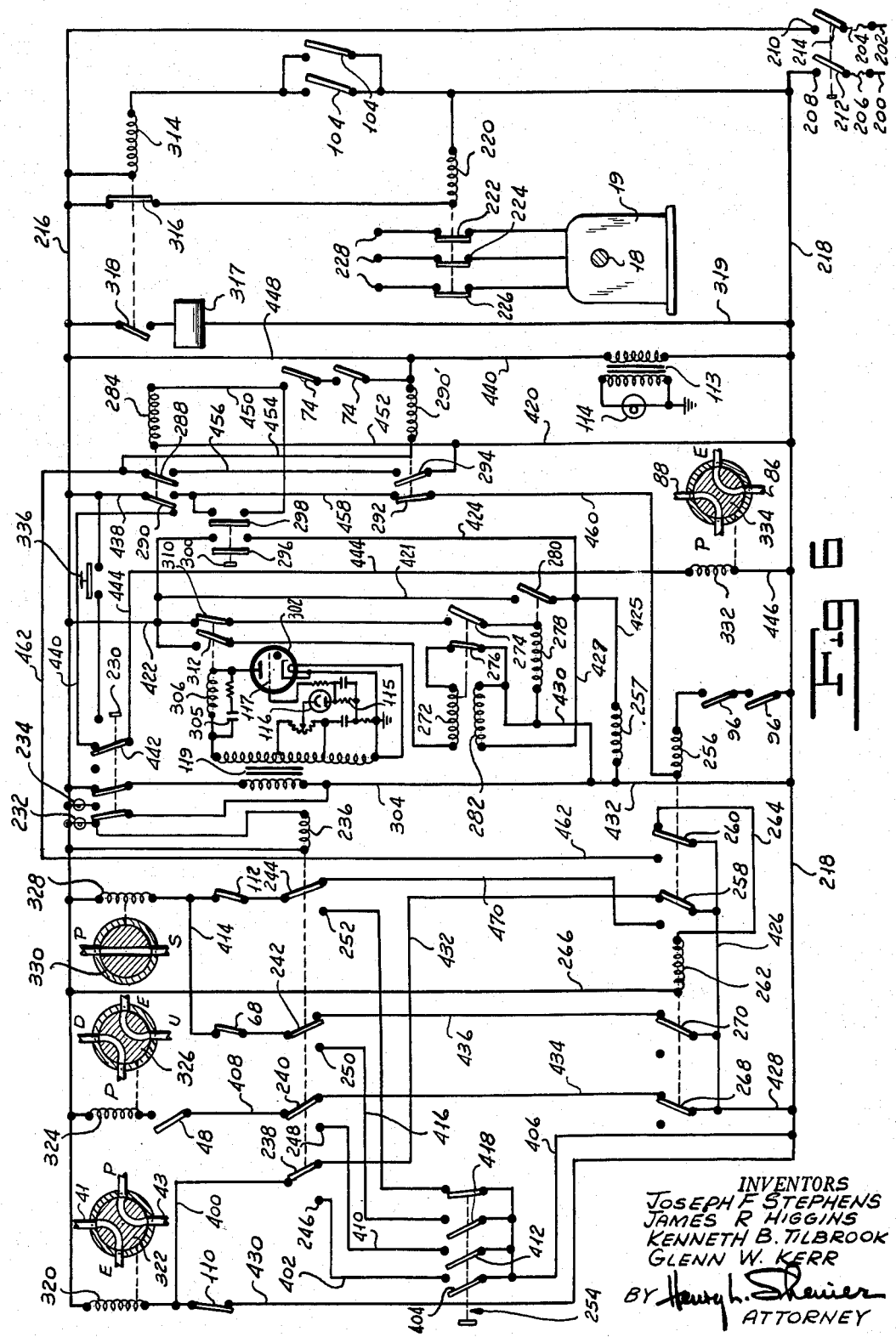

United States Patent Office 2,742,240
Patented Apr. 17, 1956

2,742,240

MAT WINDING MACHINE

Joseph F. Stephens, James R. Higgins, and Kenneth B. Tilbrook, Kansas City, Mo., and Glenn W. Kerr, Mission, Kans., assignors to Gustin-Bacon Manufacturing Co., Kansas City, Mo., a corporation of Missouri Application April 1, 1953, Serial No. 346,082

17 Claims. (Cl. 242—55.1)

Our invention relates to a mat winding machine and more particularly to a machine for winding lengths of mats formed of glass fibers upon mandrels preparatory to making pipe coverings or insulated ducts.

In copending application of Joseph F. Stephens and Glenn W. Kerr, Serial No. 318,856, filed November 5, 1952, there is shown a thermal pipe insulation and method of making the same in which mats of glass fibers sprayed with a binder are wound upon themselves upon mandrels to form hollow cylinders. The hollow cylinders are then molded while on the mandrels, after which the cylinders are removed from the mandrels.

In copending application of Joseph F. Stephens and Glenn W. Kerr, Serial No. 336,712, filed February 13, 1953, there are shown insulated ducts formed by winding binder-sprayed glass fiber mats upon mandrels to form tubes which are molded while on the mandrels and then removed from the mandrels.

The winding machines of the prior art employed either a plurality of rollers without a belt or a plurality of belts and the winding operation was difficult to control.

One object of our invention is to provide an improved mat winding machine which is certain in operation and in which the sequence of operations is controlled in a predetermined manner.

A further object of our invention is to provide a mat winding machine in which a mat comprising glass fibers impregnated with a tacky heat-reactive binder may be rapidly, conveniently and expeditiously wound upon itself while positioned on a mandrel to form tubes of mats which may be subsequently cured to form pipe coverings or insulated ducts.

Still another object of our invention is to provide a mat winding machine in which the mat may be compressed to a predetermined density during the winding operation.

Still another object of our invention is to provide a machine for winding mats upon mandrels in which the operation is initiated by placing a mandrel in a predetermined position on supports and in which the mat wound upon the mandrel is returned to said predetermined position and the machine stopped.

An additional object of our invention is to provide a mat winding machine provided with improved control in which a complete cycle of operations is automatically performed by the machine.

Another object of our invention is to provide a mat winding machine in which the mat is circumferentially confined during the wrapping of the mat upon the mandrel throughout substantially its entire periphery.

Other and further objects of our invention will appear from the following description.

In the accompanying drawings which form part of the instant specification and which are to be read in conjunction and in which like reference numerals are used to indicate like parts in the various views:

Figure 1 is a perspective simplified view of a mat winding machine showing one embodiment of our invention with parts removed for clarity of showing.

Figure 2 is a diagrammatic view of the machine shown in Figure 1 in the position shown in Figure 1.

Figure 3 is a diagrammatic view similar to Figure 2 showing the parts in position ready to wind or wrap a mat upon a mandrel.

Figure 4 is a fragmentary view drawn on an enlarged scale viewed along the plane 4—4 of Figure 1 showing a portion of the mandrel support and the mandrel arm.

Figure 5 is a fragmentary sectional view taken along the line 5—5 of Figure 4.

Figure 6 is a diagrammatic view of the automatic controls for our mat winding machine.

In general, our invention contemplates the provision of a frame on which there is mounted a pair of fixed rolls, a pair of pivoted rolls and a fixed driving roll. A wide, strong, flexible belt made of rubberized fabric such as canvas or the like is passed over the rolls. The belt also carries a weighted roll which floats upon the belt and is supported thereby for the purpose of applying a predetermined tension upon the winding or wrapping belt. A mandrel is carried by a pair of mandrel arms for swinging movement away from and to a position where the belt wraps around the mandrel. The wrapping of the belt around the mandrel is controlled by a pair of pivoted rolls which are mounted on a pair of roll arms. Readily releasable means are provided for rotatably supporting the mandrel upon centers carried by the mandrel arms. The driving roll is driven by any suitable prime mover, such as an electric motor. A pair of mandrel arms and roll arms may be actuated manually, if desired. More advantageously, however, the mandrel arms and the roll arms are power driven to and from "up" positions or "down" positions by any suitable prime mover. Advantageously we employ air motors. For purposes of simplicity and convenience in understanding our construction we have omitted showing the air motors per se, since these are known to the art, and the piping for the supply of air to and from the air motors.

In order that our winding machine may be used to produce a maximum output with a minimum of attention and labor, we have provided our mat winding or wrapping machine with an improved control system. Our construction is such that an empty mandrel may be placed upon V-block supports, it being understood that the belt-driving motor is running. Our controls are such that the placing of the mandrel upon the V-block supports will result in the mandrel centers positioning themselves to carry the mandrel. The mandrel arms will then swing the mandrel onto the belt. The roll arms will then move to a position where the belt will embrace the mandrel. The end of a mat of predetermined length is then fed to the area between the mandrel and the belt to cause the mat to be wound around the mandrel by the belt. The initial movement of feeding the mat conditions the controls through a photoelectric element. When the light beam is broken by the end of the mat traversing the light beam, the controls act to move the roll arms to their upward position, after which the mandrel is moved to its upward position to deposit the mandrel containing the wrapped or wound mat on the V-block supports. As soon as the mandrel is deposited, the mandrel centers are automatically moved outwardly and the machine placed in position for another cycle.

We also provide means to stop the belt-driving motor if a length of mat longer than desired is fed to the mandrel. In addition to the automatic means, we provide manual means for cycling the machine.

While we will describe our invention for a mat winding machine, it is to be understood that our invention may be used for winding any sheet material upon a mandrel.

More particularly referring now to Figure 1, any appropriate frame 10 carries a pair of bearings 12 in which a shaft 14 is rotatably mounted. Secured to the shaft for rotation therewith we provide a driving roll 16. The shaft 14 is provided with an extension 18 which is coupled to or secured to any appropriate prime mover such as an electric motor 19. A pair of bearings 20 carried by the frame 10 support a shaft 22 by which a fixed belt roll 24 is rotatably supported. A pair of bearings 26 carried by the frame 10 support a shaft 28 which carries a second fixed belt roll 30. A pair of bearings 32 secured to the frame 10 in any appropriate manner rotatably carry a shaft 34 to which a pair of cranks or arms 36 are secured for rotation therewith. The shaft 34 is adapted to be rotated by an air motor. The air motor may, for example, conveniently take the form of a double-acting piston 31 in a cylinder 33 driving a rack 35, engaging a pinion 37, engaging spur gear 39 carried by the shaft 34. The air piping to the air motor is shown diagrammatically in Figure 6. When air is admitted to pipe 41, and pipe 43 is connected to exhaust, the rack 35 will move to the left as viewed in Figure 1 to rotate the pinion 37 in a counterclockwise direction and the spur gear 39 in a clockwise direction, thus rotating the roll arms 36 to move the roll arms to the "down" position. The roll arms 36 carry a pair of shafts 38 and 40. One of the movable guide rolls 42 is carried by the shaft 38. The other of the movable guide rolls 44 is carried by the shaft 40. The rotation of shaft 34 in a counterclockwise direction as viewed in Figure 1 will move the roll arms 36 to the "up" position against stops 46 actuating a microswitch 48. In this position it will be noted that roll 44 is not in engagement with the belt 50 which is carried by the two fixed rolls 24 and 30, the movable roll 42 and the driving roll 16. The belt 50 is maintained taut with a predetermined tension by means of a weighted tensioning roll 52 which is centerless in that it floats and is carried by the belt 50. Weights 54 made of lead or other heavy metal may be attached to a shaft 56 carried by the tensioning roll 52. The weights 54 act, too, to prevent the floating roll 52 from riding off of the belt as they project downwardly past the edges of the belt 50. If desired the weights 54 may be guided by the frame for upward and downward movement as the belt becomes displaced due to the pivoting of the roll arms and mandrel arms.

A pair of bearings 60 rotatably support a shaft 62 to which the mandrel arms 64 are secured for rotation therewith. The mandrel arm shaft 62 is driven by an air motor (not shown) in a manner similar to the driving of roll arm shaft 34. Rotation of the shaft 62 in a counterclockwise direction, as viewed in Figure 1, drives the mandrel arms against a pair of stops 66 carried by the frame. In this "up" position the mandrel engages the actuating arm of switch 68. The frame 10 carries a pair of pillars 70 which carry V-blocks 72, best shown in Figures 4 and 5. Carried by the pillars 70 adjacent the V-blocks are switch housings 74, one carried by each of the pillars 70. The arrangement is such that when a mandrel 76 is placed upon the V-blocks 72 its shaft 78 will engage the switch-actuating members 80 to close the V-block switches in housings 74, as will be pointed out more fully hereinafter. The mandrel arms 64 carry a pair of reciprocating centers 82 actuated by an air piston within cylinders 84. The piston is a double-acting one. When pipe 86 is connected to air pressure and pipe 88 is connected to exhaust, the piston will move to the right to engage the tip 90 of the center 82 within the hollow shaft 78 of the mandrel 76, it being understood there is one center carried by each of the mandrel arms 64. When pipe 88 is connected to a fluid pressure source such as air, and pipe 86 is connected to exhaust, the piston will move to the left and bring the center tip 90 to the left, as viewed in Figure 4, that is, it will bring the centers out of the mandrel shaft 78. It is understood, of course, that this occurs when the mandrel is carried through its shaft 78 by the V-blocks 72. In the centers "out" position, that is, with the centers to the left as viewed in Figure 4, an arm 92 will contact the switch-actuating member 94 of a center switch 96 carried by the mandrel arm 64. It is to be understood that there is one center switch for each of the mandrel centers carried by the two mandrel arms 64. Each of the mandrel centers 82 is mounted on a spring-pressed block 100 biased by spring 102, as can readily be seen by reference to Figure 5. The initial position of the block 100 may be adjusted by screw 101 which may be rotated by inserting a wrench on squared end 103. In event a mat of too great length is wound upon a mandrel, the wrapped cylinder will become excessively thick. When this occurs, a higher pressure will be developed between the mandrel and the pocket-forming rolls. The center mounting block 100 carries a switch housing 104 provided with an actuating member 106. The end of the mandrel arm 64 carries a pin 108. The tension of the spring 102 is sufficient to give proper compression and wrap density with a mat of correct thickness and length. If, however, a mat which is initially too thick or too long is wrapped on the mandrel, the center blocks 100 will move against the action of springs 102 to cause normally open switches 104 to close to stop the belt drive motor, as will be explained more fully hereinafter. When the mandrel arms 64 are rotated in a clockwise direction, that is, to the "down" position, the mandrel arms will actuate a switch 110. The downward position of the mandrel arms is determined by stops 67 adjustably carried by the frame 10. When the roll-carrying arms are moved downwardly, that is, rotated in a clockwise direction, as viewed in Figure 2, to a "down" position, they will actuate a roll arm down limit switch 112. The downward position of the roll arms is governed by stops 47 which, like all of the other limit stops, may be adjusted. A source of light which is an incandescent lamp 114 is directed in front of the driving roll 16 upon a photoelectric cell 116. A feeding conveyor 118 driven by a roll 120 is adapted to convey mat sections 122 to the mat winding machine for rolling upon the mandrel.

Referring now to Figure 6, the control circuit shown is energized from a source of alternating current potential drawn from a pair of main lines 200 and 202. It is to be understood, of course, that any appropriate potential source may be employed, including direct current. For purposes of clarity in describing the flow of current through our controls, we will assume that line 202 is positive and line 200 is negative. It is understood, of course, by those skilled in the art, that this is an instantaneous condition with alternating current and that the polarity is reversed on the next half cycle of the alternating potential. A pair of fuses 204 and 206 are interposed between the main lines and the terminals 208 and 210 of our control circuit. The terminals are adapted to be energized through the blades 212 and 214 of a double pole switch. As soon as the control mains 216 and 218 are energized, current will flow through the winding 220 of a motor starter closing the switches 222 and 224 and 226 to energize the belt drive motor 19 by connecting it to the terminals 228. While it is understood that any appropriate source of potential may be employed, we prefer to use a three-phase 440-volt 60-cycle potential to energize the induction belt drive motor 19.

The control circuit is adapted to operate either manually or automatically. The switch that determines which type of operation is to be employed is indicated by the reference numeral 230 and is shown in the automatic position. In this position the indicator lamp 232 will be illuminated while the manual indicator lamp 234 will be out. When the selector switch 230 is in the automatic position, as shown, the winding 236 will be energized to position the automatic position switch comprising the relay armatures 238, 240, 242 and 244 in the position shown in Figure 6 for automatic operation. If winding 236 is de-energized by throwing selector switch 230 to break the circuit through the winding 236, armature 238 will contact contact points 246, armature 240 will make contact with contact point 248, armature 242 will make contact with contact point 250 and armature 244 will make contact with contact point 252. In the manual position the manual cycling switch indicated generally by the reference numeral 254 can then be operated to control the operation of the machine, as will be pointed out more fully hereinafter. This switch is shown in Figure 6 in the downward driving position. The cycling relay winding 256 controls the position of armatures 258 and 260. The armatures are shown in the upward driving position in which the auxiliary cycling relay winding 262 is energized through armature 260, conductor 264 and conductor 266. In the energized position the auxiliary cycling relay winding will position the armatures 268 and 270 in the positions shown in Figure 6. The cycling relay, which is actuated upon the energization of winding 256 is of the latching type, that is, its armatures remain in the position to which they are moved upon energization of the winding by a mechanical latch. This latch is released, that is, the relay is reset, upon the energization of the resetting winding 257. A delay interlock relay winding 272 controls the armatures 274 and 276. The relay which is actuated by winding 272 is of the mechanical latching electrical reset type, as is the relay 256. A mat delay relay winding 278 controls the armature 280. The resetting of the delay interlock relay controlled by winding 272 is accomplished through the energization of winding 282. The centers relay winding 284 controls a centers relay which is of the impulse type, successive impulses moving the armatures 288 and 290 controlled by the winding. The armatures are shown in Figure 6 in the open position. The energization of cycle interlock relay winding 290 controls the positioning of armatures 292 and 294. Armatures 296 and 298 are controlled by the reset push button 300. A thyratron 302 is controlled by a photoelectric tube 116 connected in an appropriate circuit, the light from an incandescent lamp 114 cooperating with the photoelectric tube 116, as will be pointed out more fully hereinafter. When the thyratron fires, it will energize relay winding 306, which controls the position of armatures 310 and 312. The closing of mandrel overwrap alarm switches 104 will energize the overwrap alarm relay winding 314 which controls the armatures 316 and 318. The armatures are shown in Figure 6 in the "no-alarm" position.

A solenoid winding 320 controls a four-way roll arm control valve 322. When the solenoid 320 is energized, the valve 322 is positioned to drive the roll arm upwardly, that is, pipe 43 will be connected to a fluid pressure manifold P and pipe 41 will be connected through the valve to an exhaust manifold E. While we will describe our invention with respect to the use of air pressure, it is to be understood that any appropriate source of fluid pressure may be employed.

The solenoid winding 324 controls the four-way mandrel arm control valve 326. The arrangement is such that when the solenoid is energized, the mandrel arm motor will drive upwardly. When the solenoid 324 is de-energized, the mandrel arm motor will drive downwardly. In the drawings, the solenoid winding 324 is shown de-energized. In this position it will be noted that the valve 326 is such that the pipe D, which controls the downward movement of the fluid pressure motor, is connected to the fluid pressure manifold P, and the pipe U, which controls the upward direction of drive, is connected to the exhaust manifold E. The solenoid winding 328 controls the two-way fluid pressure supply valve 330. The arrangement is such that when the solenoid 320 is energized, the valve 330 is in the open position, that is, the pipe S connected to any appropriate source of fluid pressure (not shown) is in communication with the pressure manifold P. The solenoid winding 332 controls a four-way mandrel center cylinder control valve 334. The arrangement is such that when the solenoid is de-energized the centers will be driven in, and when the solenoid is energized, the centers will be driven out. A separate push button switch 336 is provided for energizing the winding 332 in the manual position of the selector switch 230. The valve 334 is shown in the position when the solenoid 332 is energized. In this position the pipe 88 is connected to a pressure manifold P' which is separate from the manifold P and is constantly connected to the fluid pressure source, thus driving the centers out. The other side of the piston in the cylinder 84 is connected to the exhaust manifold E through pipe 86.

In operation, the switch 230 is first moved to its center, or neutral, position; the manual switch 336 is thrown to "open" or "off" position. The main power switch is actuated to connect the control terminals 208 and 210 to the power mains 200 and 202. The switch 230 is now thrown to the manual position. The manual cycling switch 254 is now operated to the "up" position. In this position, current will flow from main 216 through solenoid 320, through conductor 400, through armature 238, through conductor 402, through armature 404, through conductor 406, to the other side of the line 218, thus energizing the solenoid winding 320 and positioning the valve 322 to drive the roll arm to its "up" position, as shown in Figures 1 and 2. In the "up" position, the roll arm will close normally open roll arm up limit switch 48. Current will now flow from the main 216 through the winding 324 through roll arm up limit switch 48, through conductor 408, through armature 240, through conductor 410, through armature 412, through conductor 406 to the other side of the line 218, energizing the solenoid winding 324. This will position the four-way mandrel arm control valve 326 so that the "up" driving pipe U is connected to the pressure manifold and drives the mandrel arm to its "up" position. It is to be understood, of course, that the air supply solenoid winding 328 is energized by current flowing from conductor 216 through the winding 328, through conductor 414, through normally closed mandrel arm up limit switch 68, through armature 242, through conductor 416, through armature 418, through conductor 406, to the other side of the line 218. The energization of the air supply solenoid 328 will supply air to the pressure manifold P.

As soon as the mandrel arm reaches its upward position it will open the normally closed up limit switch 68 and thus interrupt the current through the solenoid winding 328. When this occurs, the air supply valve 330 is operated to shut off the air supply.

The V-block switches 74 will be in their normally open position when there is no mandrel on the V-blocks. If, by any chance, the centers relay is in the closed position, it is automatically moved to its open position by pressing the reset button 300. It will be readily observed that if the centers relay is in the closed position, current will flow from the main 216, through the armature 290, through the armature 298, through the centers relay winding 284, through the conductor 420, to the other side of the line. This will operate the impulse-type relay and move the armature 288 and armature 290 to their "open" position, as shown in Figure 6. If the armature 290 is in the "open" position, as shown in Figure 6, the closing of armature 298 by pressing the reset button 300 will not affect the centers relay winding. At the same time, the pressing of the reset button 300 will close armature 296 so that current will flow through conductor 422, through conductor 424 and through conductor 425, energizing the resetting winding 257 to reset the cycling relay. Current will also flow from conductor 424, through conductor 427, through resetting winding 282, through conductor 430, through conductor 432, to the other side of the line. In this manner the pressing of the reset button insures that the centers relay is in the open position and that the cycling relay is unlatched and that the delay interlock relay is unlatched.

In the manual position, of course, of the switch 230, the indicator lamp 234 will be energized. When it is desired to set the machine into automatic operation, the switch 230 is moved to the "automatic" position shown in Figure 6, energizing the indicator lamp 232. It is understood, of course, that the incandescent lamp 114 is also illuminated through potential derived from the secondary winding of the transformer 113, the primary of which is connected across the conductors 216 and 218 by conductor 440. In the "automatic" position of switch 230, as shown in Figure 6, the winding 236 will be energized and will move armatures 238, 240, 242 and 244 to the positions shown. The cycling relay winding 256 will be de-energized so that switch members 258 and 260 will be in the position shown. The closing of switch member 260 permits current to flow from conductor 216 through conductor 266, through winding of auxiliary cycling relay 262, through conductor 264, through armature 260, through conductor 426, through conductor 428, to the other side of the line 218, thus energizing the auxiliary cycling relay 262 and moving armatures 268 and 270 to the position shown in Figure 6. The closing of armature 238 will energize solenoid winding 320 and move the valve 322 to drive the roll arm to its up limit position against its stop 46. The circuit through solenoid 320 can be established either through the normally closed mandrel arm down limit switch 110 through conductor 430 or through conductor 400, armature 238, conductor 432, armature 258, conductor 426, conductor 428, to the other side of the line 218. When the roll arm is driven against its stop 46 it will actuate the normally open roll arm up limit switch 48 to close the circuit through solenoid winding 324 from conductor 216 through the now closed limit switch 48, through conductor 408, through armature 240, through conductor 434, through closed armature 268, through conductor 428, to the other side of the line 218. The energization of the winding 324 will rotate the four-way valve 326 actuating it to drive the mandrel arm to its "up" position through the mandrel arm motor. It is understood, of course, that heretofore the air supply to the air manifold P was connected through valve 330 since solenoid 328, which controls valve 330, was energized through the normally closed mandrel arm up limit switch 68, armature 242, conductor 436, armature 270, conductor 426, conductor 428, to the other side of the line 218. As soon as the mandrel arm reaches its "up" position against its stop 66 it will actuate the normally closed mandrel arm up limit switch 68 to open it and thus interrupt the circuit which has been energizing solenoid 328 and thus close the valve 330 to interrupt the fluid pressure supply to the fluid pressure manifold P. The V-block switches 74 are in the open position, the mandrel center switches 96 are in the open position and the centers are in the outward position so that the switches 96 are being held in the open position. The mandrel center cylinder solenoid 332 is energized by current flowing from conductor 216, conductor 438, armature 290, conductor 440, armature 442 of the automatic switch 230, conductor 444, through the mandrel center cylinder solenoid winding 332, through conductor 446, to the other side of the line 218. The energization of the solenoid winding 332 will move the valve 334 to the position shown in Figure 6, driving the mandrel centers out through the admission of fluid pressure through manifold P' to the pipes 88 of the center cylinders. This outward movement, of course, brings the members 92 against the members 94 and thus opens the mandrel centers switches 96. The cycling relay 256 is de-energized and thus in its upward driving position, as shown in Figure 6. The auxiliary cycling relay winding 262 is energized as shown in Figure 6.

The mat delay relay winding 278 is de-energized as shown in Figure 6. The delay interlock relay winding 272 is locked in the open position, as shown in Figure 6. The light from incandescent lamp 114 is falling on the phototube 116. When this occurs, the phototube will conduct. The I. R. drop through resistor 115 of the phototube will reduce the potential upon the grid 117 of the thyratron to a sufficiently negative degree that the thyratron 302 will not conduct whenever the alternating potential impressed upon its plate through the secondary of the transformer 119 is positive. This will maintain the winding 306 de-energized, holding the armatures 310 and 312 in their "light" position shown in Figure 6. Whenever the light upon phototube 116 is interrupted, the grid 117 of the thyratron 302 becomes positive so that the thyratron will now conduct when the plate becomes positive during the alternating potential. The thyratron, of course, will conduct only intermittently due to the alternating potential. However, the charge upon capacitor 305 is sufficient to maintain the winding 306 energized during the negative or non-conducting portions of the cycle. When the grid 117 is negative, however, the thyratron will not fire when the plate becomes positive during the alternating potential. In this manner the winding 306 will be de-energized whenever light falls upon the phototube 116 and will be energized whenever the light to phototube 116 is interrupted.

The mat delay relay winding 278 is likewise de-energized. This mat delay relay winding is adapted to close armature 280. The relay is of the delay type, which is well known to the art, and can be adjusted to any appropriate delay, say between no delay and thirty seconds. The time delay is adjusted to give a predetermined delay for the particular mandrel size being employed.

The apparatus is now in condition to start a cycle. The mat to be wound on the mandrel is placed on conveyor 118. The cycle is initiated by inserting a mandrel 76 upon the V-blocks. This closes the V-block switches 74, thus energizing the centers relay winding 284 through conductor 448, conductor 450, conductor 452 and conductor 420. The energization of the winding 284 will move the armatures 290 and 288 to the right, as viewed in Figure 6, closing two circuits and breaking one and locking the armatures 288 and 290 in the closed position. The circuit broken is that through armature 290 holding the solenoid winding 332 energized. As soon as solenoid 332 becomes de-energized, the valve 334 will move to a position driving the mandrel centers in and supporting the mandrel by the mandrel arm centers. As soon as the mandrel centers move inwardly, the mandrel centers switches 96 will close. The first circuit established by the energization of the centers relay winding 284 is that through the cycling relay winding 256 by way of conductor 438, armature 290, conductor 458, armature 292, conductor 460 and the now closed mandrel centers switches 96. The energization of the winding 256 will move armatures 258 and 260 to the left. Moving armature 260 to the left interrupts the circuit through the auxiliary cycling relay 262 and makes a circuit through the cycle interlock relay winding 290', current flowing from conductor 216, through conductor 448, through the cycle interlock relay winding 290', through conductor 454, through conductor 462, through armature 260, through conductor 426, through conductor 428, to the other side of the line 218. The energization of the cycle interlock relay winding 290' opens switch 292 and interrupts the circuit through the cycling relay winding 256. This relay, however, is locked in its down-driving position. The second circuit made by the actuation of the centers relay winding 284 is now established. The current will flow from conductor 216, through conductor 448, through winding 290', through conductor 454, through armature 288, through conductor 456, through armature 294, through conductor 420, to the other side of the line 218. This second circuit, it will be observed, maintains the cycle interlock relay winding 290' energized and prevents another cycle from being re-established. It will be remembered that both the mandrel arm and the roll arm are in their up limit positions. In the up limit position the roll arm down limit switch 112 is closed. When the cycling relay is actuated, the air solenoid 328 will become energized by current flowing through the normally closed roll arm down limit switch 112, through armature 244, through conductor 470, through armature 258, through conductor 426, through conductor 428, to the other side of the line 213. This will energize the solenoid winding 328 and move the valve 330 to its air-supplying position, that is, to open the valve to provide communication between the fluid pressure source S and the fluid pressure manifold P. When the auxiliary cycling relay becomes de-energized, the circuit through solenoid winding 324 is interrupted by the movement of armature 268 to the left. The de-energization of the winding 324 will move the valve 326 to the position shown in Figure 6, that is, it connects the down-driving side of the cylinder or air motor which drives the mandrel arms to the source of fluid pressure so that the mandrel arms 64 are rotated in a clockwise direction as viewed in Figures 1 and 2, owing to the clockwise driving of the shaft 62 by the air motor. This clockwise rotation of the mandrel arms which now bear the mandrel through the mandrel centers, will lift the mandrel out of the V-blocks and open the V-block switches 74. The mandrel arms will come to rest against their "down" stops 67 and in so doing will open the mandrel down limit switch 110, thus interrupting the circuit through roll arm valve solenoid winding 320. This will rotate the roll arm control valve 322 to connect pipe 41 with the pressure manifold P; and pipe 43 with the exhaust manifold E, driving the piston 31 of the roll arm air motor to the left, as viewed in Figure 1. This will rotate the pinion 37 in a counterclockwise direction and the spur gear 39 in a clockwise direction, thus rotating the shaft 34 and the roll arms 36 in a clockwise direction, as viewed in Figures 1 and 2, bringing the roll arm to the position shown in Figure 3. It will be observed that the roll arm carries the pair of movable rolls 42 and 44. The roll 42, cooperating with the driving roll 16, forms a pocket of the belt embracing the mandrel 76, as can readily be seen by reference to Figure 3. The clockwise rotation of the roll arms 36 will bring the roll arms against their down limit stops 47 and actuate the roll arm down limit switch 112 to open it. This interrupts the circuit through the air supply valve solenoid winding 328 and closes the air supply, interrupting it in so far as the air motors for the roll arms and mandrel arms are concerned.

The belt motor is driving the belt 50 around the mandrel which is carried by the centers supported by the mandrel arms. The belt traverses the two fixed rolls 24 and 30 and the two movable rolls 42 and 44, being driven by the driving roll 16. The tension with which the belt embraces the mandrel is determined by the weight of the tensioning roll 52 and its associated masses 54. The machine is now ready for the reception of a mat to be wound. A mat of glass fibers 122, for example, is placed upon a conveyor 118. The conveyor may be continuously operating and, any, appropriate means, such as another conveyor, for example, may be employed to deposit the mat 122 upon the conveyor 118. If desired, the mat may be in position upon conveyor 118 and the conveyor may be idle, to be driven by any appropriate motor actuated by the operation of the roll arm down limit switch 112, as will be readily understood by those skilled in the art. The glass fiber mat 122 will move to the left, as viewed in Figure 3, and interrupt the light beam from the source 114 upon the phototube 116. When this occurs, the current through winding 306 is established. This opens the circuit through armature 310 and closes the circuit through armature 312 through which the delay interlock relay winding 272 is energized. The energization of winding 272 moves armatures 274 and 276 to the left, the armatures being locked in this position mechanically. They will be released electrically by the energization of the winding 282. The movement of armature 274 to the left completes part of the circuit through the mat delay relay winding 278. The circuit is now broken by the armature 310 having been moved to the left by the interruption of light upon the phototube 116. The phototube will remain in its "no light" position as long as the mat 122 is passing from the conveyor 118 to the mandrel and is being wound upon the mandrel through the action of the belt 50, as will be readily understood by those skilled in the art. There is enough space between the pocket-forming roll 42 and the driving roll 16 so that the mat will rest by gravity upon that portion of the belt 50 which will convey the mat which is being wound to the mandrel and carry it about the mandrel. As soon as the mat is rolled on the mandrel, its trailing edge will pass out of the path of the light beam and permit light again to fall upon the phototube 116. When this occurs, the phototube will again conduct to bias the grid of the thyratron so that it will no longer conduct, thus de-energizing the relay winding 306. Contact 310 will again move to the position shown in Figure 6 and complete a circuit through the mat delay relay winding 278. After the predetermined delay, which has been preset, armature 280 will move to the left. This closes the circuit so that current will flow from conductor 216, through conductor 422, through conductor 421, through armature 289, through conductor 425, energizing the winding 257, releasing the cycling relay from its downward driving position and permitting it to resume its up driving position. At the same time, current will flow through conductor 427, through winding 282, through conductor 430, through conductor 432, energizing the release winding 282 to release the latched delay interlock relay, permitting the armatures 276 and 274 to return to the position shown in Figure 6. This breaks the circuit through the mat delay relay winding 278 by interrupting it through armature 274. The movement of the cycling relay to its upward driving position re-energizes the auxiliary cycling relay 262, thus re-establishing the air supply through the normally closed mandrel arm up limit switch 68 and now closed auxiliary cycling relay armature 270. The roll arm valve solenoid winding 320 is energized through armature 258 and drives the roll arm upwardly to the position shown in Figure 2 until it reaches its upward stop 46 and closes the roll arm up limit switch 48. The closing of the roll arm up limit switch 48 establishes a circuit through the mandrel arm solenoid 324 through the now closed auxiliary cycling relay armature 268. This moves the mandrel motor control valve 326 to a position to drive the mandrel motor in its upward direction to raise the mandrel arms upward against their stops 66 and open the mandrel arm up limit switch 68 which now interrupts the circuit through air supply solenoid winding 328 and closes the air supply to both the mandrel and roll arm driving motors.

As soon as the mandrel reaches its up stops, the mandrel with the rolled or wound mat thereon is repositioned in the V-blocks. This recloses the V-block switches and re-energizes the impulse-type centers relay through its winding 284. This returns the centers relay to its open position, as shown in Figure 6. The moving of armature 290 to its open position re-establishes the circuit through mandrel center cylinder solenoid winding 332 and moves the centers outwardly, while the mandrel is supported by the V-blocks. As soon as the centers move outwardly, the mandrel centers switches 96 are opened, interrupting the circuit through the cycling relay winding 256. The energization of the centers relay winding 284 opens the holding circuit through the cycle interlock relay winding 290' through armature 288, thus allowing the cycle interlock relay to return to its normal position as shown in Figure 6. The rolled mat upon the mandrel can then be removed from the V-blocks manually and the machine is ready to receive another mandrel for the next cycle.

If an abnormally thick mat or one too long for the mandrel size is delivered to the machine, the mat will be wound around the mandrel and built up to a greater thickness than is desired. The required wrap density is achieved by compressing the mat between the mandrel and the pocket-forming roll and the drive roll, governed, of course, by the weight upon the tensioning roll. The friction, however, of the belt is such that an overly thick wrap would instantaneously develop higher pressures than desired. These pressures might develop to a point where the mandrel or the mandrel centers may become damaged. In order to prevent damage to the mandrel from this cause, the mandrel centers are mounted on spring-loaded blocks, which are adjustable for different mandrel sizes. The initial spring tension is sufficient to give proper compression and wrap density with a mat of correct thickness and length. The spring tension, however, will allow the centers to move with an overwrap upon the mandrel. When the center blocks move, they will close the mandrel overwrap alarm switches 104, the closing of either one of which will energize the winding 314. When the winding becomes energized, the opening of armature 316 will de-energize the motor starter winding 220 to stop the motor 19 which drives the belt. At the same time the switch 318 will be closed to energize an overwrap alarm 317 through the conductor 319. The automatic switch can then be moved to manual position and the parts moved upwardly to a position where the excess mat can be cut off to remove the overwrap condition.

It will be seen that we have accomplished the objects of our invention. We have provided an improved mat winding machine which is certain in operation and in which the sequence of operations is automatically controlled in a predetermined manner. Mats may be wound conveniently, expeditiously and rapidly upon themselves while positioned on mandrels to form tubes of the mats. The mat material may be compressed radially to a predetermined density during the winding operation. The operation of our machine is automatically initiated by placing an empty mandrel in a predetermined position on V-block supports, to which position the mat wound upon the mandrel is returned and the machine automatically stopped. We have provided an improved control for mat winding machines adapted to supervise the sequential cyclic operation of the machine. It will be further noted that our mat winding machine substantially completely confines the mat circumferentially during the winding operation.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. In a winding machine, a mandrel, means for rotatably supporting the mandrel in a fixed position during a winding operation, a plurality of rolls, an endless belt carried by the rolls, two of said rolls having their peripheries positioned adjacent to each other and to the periphery of the mandrel to form a pocket of the belt extending around the major portion of the periphery of the mandrel and means for rotating one of said rolls to drive the belt and rotate the mandrel.

2. A winding machine as in claim 1, in which said means for rotatably supporting the mandrel comprises a pair of arms, centers carried by said arms and means for reciprocating said centers.

3. In a winding machine, a mandrel, means for rotatably supporting the mandrel, a plurality of rolls, an endless belt carried by the rolls, two of said rolls having their peripheries positioned adjacent to each other and to the periphery of the mandrel to form a pocket of the belt extending around the major portion of the periphery of the mandrel, means for rotating one of said rolls to drive the belt and rotate the mandrel and means for maintaining the belt under tension.

4. A winding machine as in claim 3, in which said means for maintaining the belt under tension comprises a floating roll carried by the belt.

5. In a winding machine, a mandrel, a pair of arms for rotatably supporting the mandrel, a plurality of fixed rolls, a pair of roll arms, a movable roll rotatably carried by the roll arms, an endless belt carried by said fixed and movable rolls, means for moving the mandrel arms to bring the mandrel selectively to a position remote from or adjacent to one of said fixed rolls, means for moving the roll arms to bring the movable roll selectively to a position remote from or adjacent to said last named fixed roll and said mandrel to form a pocket of the belt extending around the major portion of the periphery of the mandrel and a motor for rotating one of said fixed rolls to drive the belt and rotate the mandrel.

6. A winding machine as in claim 5, including means carried by the mandrel arms for yieldably supporting the mandrel and means responsive to movement of said yieldable support for stopping said motor.

7. A winding machine as in claim 5, having means for supporting the mandrel adjacent the mandrel arms when the mandrel arms are in remote position, means responsive to the positioning of said mandrel upon said supporting means for interengaging the mandrel and the mandrel arms and means responsive to the interengagement of the mandrel and the mandrel arms for actuating said mandrel arm moving means to move the mandrel from its position remote from said fixed roll to a position adjacent said fixed roll.

8. A winding machine as in claim 5, including in combination means responsive to the positioning of the mandrel arms from their position remote from one of said fixed rolls to a position adjacent said fixed roll for actuating said roll arm moving means to move the roll arms from their position remote from said fixed roll to a position adjacent said fixed roll.

9. A winding machine as in claim 5, including in combination photoelectric means for actuating said roll arm moving means to move the roll arms from a position adjacent said fixed roll to a position remote from said fixed roll.

10. A winding machine as in claim 5, including means responsive to the positioning of the roll arms from their position adjacent said fixed roll to a position remote from said fixed roll for actuating said mandrel arm moving means to move the mandrel arms from a position adjacent said fixed roll to a position remote from said fixed roll.

11. A winding machine as in claim 5, including means responsive to the movement of the roll arms from their position remote from said fixed roll to a position adjacent said fixed roll for rendering said mandrel arm and roll arm moving means inoperative.

12. A winding machine as in claim 5, including in combination means responsive to the movement of said mandrel arms from their position adjacent said fixed roll to a position remote from said fixed roll for rendering said mandrel arm and roll arm moving means inoperative.

13. A winding machine as in claim 5, including means for interengaging the mandrel arms and the mandrel and means responsive to the interengagement of the mandrel arms and the mandrel for rendering said means for moving the mandrel arms and said means for moving the roll arms operative.

14. A winding machine as in claim 5, including in combination photoelectric means and means responsive to said photoelectric means for rendering said means for moving said mandrel arms and means for moving said roll arms operative.

15. A winding machine, including in combination a mandrel, a pair of mandrel arms, means carried by the mandrel arms for releasably supporting the mandrel for rotation, a pair of roll arms, a pair of movable rolls carried by said roll arms, a plurality of fixed rolls, an endless belt carried by said fixed and movable rolls, means for moving the mandrel arms to carry the mandrel to a position adjacent one of said fixed rolls, means for moving said roll arms to carry one of said movable rolls to a position adjacent both said mandrel and said last named fixed roll to form a pocket of the belt extending around the major portion of the periphery of the mandrel and a motor for rotating one of said fixed rolls to drive the belt and to rotate said mandrel.

16. A winding machine, including in combination a mandrel, a pair of mandrel arms, means carried by the mandrel arms for releasably supporting the mandrel for rotation, a pair of roll arms, a pair of movable rolls carried by said roll arms, a plurality of fixed rolls, an endless belt carried by said fixed and movable rolls, means for moving the mandrel arms to carry the mandrel to a position adjacent one of said fixed rolls, means for moving said roll arms to carry one of said movable rolls to a position adjacent both said mandrel and said last named fixed roll to form a pocket of the belt extending around the major portion of the periphery of the mandrel, a motor for rotating one of said fixed rolls to drive the belt and to rotate said mandrel, and a floating roll carried by the belt for maintaining the belt under a predetermined tension.

17. In a winding machine, a pair of pocket-forming rolls and at least a third roll, an endless belt carried by the rolls, a mandrel, means for rotatably supporting the mandrel adjacent the pocket-forming rolls in a fixed position during a winding operation, means for relatively moving the pocket-forming rolls toward each other to form a pocket of the belt extending around the major portion of the periphery of the mandrel and means for rotating at least one of the rolls to drive the belt.

References Cited in the file of this patent

UNITED STATES PATENTS

| 2,262,160 | Beard et al. | Nov. 11, 1941 |
| 2,270,043 | Fourness et al. | Jan. 13, 1942 |
| 2,353,821 | Fourness et al. | July 18, 1944 |
| 2,357,157 | Wood | Aug. 29, 1944 |
| 2,646,230 | Aulen | July 21, 1953 |